3,011,919
METHOD OF FORMING A MULTI-LAYER PICK-UP SCREEN
Wilfrid F. Niklas, Chicago, Ill., assignor to The Rauland Corporation, a corporation of Illinois
Filed June 23, 1958, Ser. No. 743,581
3 Claims. (Cl. 117—211)

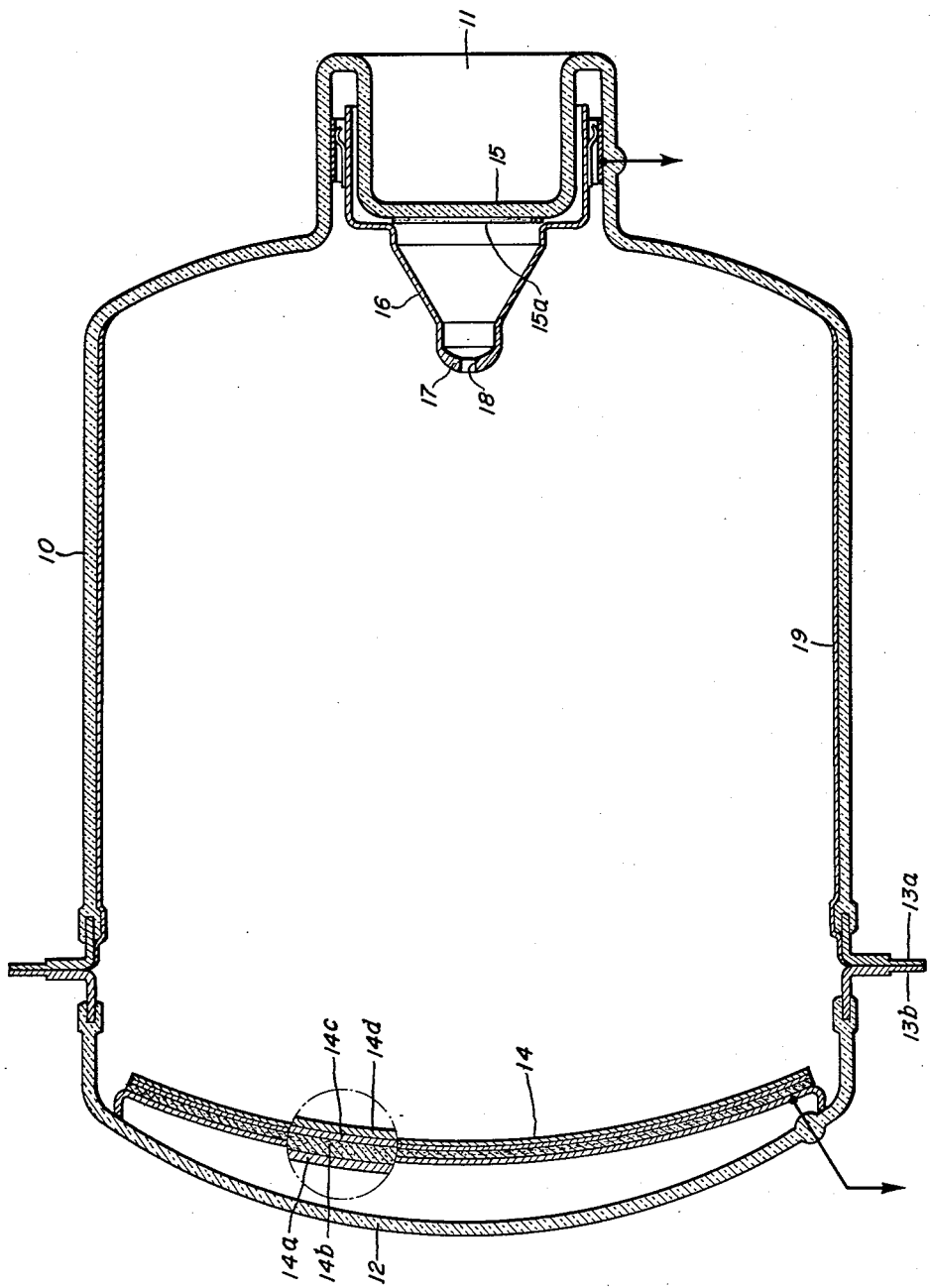

This invention relates to electron discharge devices, such as image converters, and is particularly directed to a novel method of producing a barrier layer in a composite pick-up screen employed in such image converters.

Modern image converters consist of a substantially evacuated envelope containing a composite multiple layer pick-up screen; a fluorescent viewing screen remote from the multiple layer pick-up screen upon which a reproduction of an original source image is projected; and an electron optical system intermediate the multiple layer pick-up screen and the fluorescent viewing screen for the purpose of accelerating and focusing the electron source image on the fluorescent viewing screen.

The composite pick-up screen usually comprises a phosphor layer and a photoemissive layer applied to a supporting member with a light transparent barrier layer intermediate the phosphor and the photoemissive layers. The phosphor layer may consist of a silicon resin zinc sulphide phosphor mixture applied to a supporting member while the photoemissive layer is usually of the cesiated antimony type and constitutes the cathode element of the electron optical system.

In fabricating the pick-up screen, it has been found that cesium acts as a negative catalyst for silicon resin at ordinary processing temperatures, resulting in breaking down and carbonizing the phosphor-resin surface, thereby rendering this surface unusable as the substrate surface of the photocathode layer. Therefore, it is necessary to utilize a light transparent barrier layer intermediate the phosphor-resin surface and the cesiated antimony photocathode. It is well known that aluminum oxide may be employed as a barrier layer and several methods of oxidizing aluminum to create the barrier are known to those versed in the art.

One method consists of oxidizing aluminum with steam. Although oxidation takes place rapidly, depending on temperature, it has been found that the resulting aluminum oxide barrier may frequently break down and permit cesium to penetrate to the phosphor-resin surface with most undesirable effects. It is believed that the unreliable behavior of aluminum oxide obtained by oxidation in steam or water vapor is due to the structure of the aluminum oxide layer. It is known that aluminum oxide can exist in two structurally different forms; that is, a loosely packed porous structure, and a tightly packed structure. Oxidation of aluminum in the presence of steam or water vapor converts aluminum into a thin tightly packed layer in contact with the aluminum surface progressing deeper into the metal with progressing oxidation, but possessing a loosely packed porous layer of aluminum oxide on the outside surface. Only the tightly packed aluminum oxide acts as a reliable barrier against cesium attack, but in the case of vapor oxidation the tightly packed layer is too thin to be a reliable barrier.

It is a principal object of this invention, therefore, to provide an improved method for applying an aluminum oxide barrier layer intermediate the phosphor and the photoemissive layers of a multiple layer pick-up screen.

It is a further object of this invention to provide a method for producing a tightly packed aluminum oxide barrier layer for use in multiple layer pick-up screens.

It is yet another object of this invention to provide a method of producing an aluminum oxide barrier layer for use in multiple layer pick-up screens which is self-sealing against oxygen.

In accordance with the invention, a method of forming on an X-radiation transparent substrate a multi-layer pick-up screen including a transparent barrier layer intermediate a phosphor layer and a photoemissive layer comprises the following steps: evaporating aluminum onto said fluorescent layer; heating said aluminum layer in a dry atmosphere having a maximum humidity of approximately 50% to form a tightly packed aluminum oxide layer; repeating said evaporating and heating steps to increase the thickness of said layer of tightly packed aluminum oxide to at least 80 angstroms; and forming a photo-emissive layer over said barrier layer.

The advantages of the invention are especially apparent when embodied in an X-ray image converter and, accordingly, the invention will be described in that environment although it will be understood that the inventive teachings may be applied with advantage to image converters of other types.

The features of the invention which are believed to be novel are set forth with particularity in the appended claims. The invention together with further objects and advantages thereof may best be understood, however, by reference to the following description taken in connection with the attached drawing in which the single figure is a cross-sectional side view of an X-ray image converter showing an enlarged view of a section of the multiple layer pick-up screen embodying this invention.

The image converter tube shown in the drawing comprises a substantially cylindrical glass envelope section 10 having an end portion in the form of a re-entrant press 11 and a substantially spherical glass envelope section 12 of a diameter approximately equal to that of envelope section 10. Envelope sections 10 and 12 are presealed around their entire perimeters to respective metal flanges 13a and 13b which, in turn, are sealed together by heliarc welding or the like. Suitably mounted within the spherical shaped end section 12 is a substantial spherical composite pick-up screen 14, the concave surface of which faces toward the re-entrant end of cylindrical envelope section 10. The re-entrant section 11 is closed by a flat glass plate 15 which bears on its inside surface a suitable fluorescent viewing screen 15a of silver activated zinc cadmium sulphide or the like. To the inside of re-entrant section 11 is attached a metal anode 16 having a substantially spherical shaped cap 17 provided with an axial circular aperture 18 for admitting electrons originating at multiple layer pick-up screen 14 to fluorescent viewing screen 15a. Anode 16 completely encloses and is electrically connected to fluorescent viewing screen 15a. The convex face of anode cap 17 faces the concave surface of composite pick-up screen 14. Substantially the entire cylindrical portion of envelope 10 is covered by electrode 19 in the form of a conductive wall coating which may be of copper or the like and is electrically connected to metal flange 13a.

The pick-up screen 14 is of the multi-layer type and comprises a spherically shaped support member 14a to which is applied a phosphor-resin layer 14b. Contiguous to phosphor-resin layer 14b is applied a barrier layer 14c over which is applied a photoemissive layer 14d. Support member 14a is composed of an X-radiation transparent material such as aluminum of a thickness sufficient to rigidly support the pick-up screen. Phosphor-resin layer 14b consists of an X-ray sensitive phosphor such as silver activated zinc sulphide or the like embedded in a suitable silicon resin. The barrier layer 14c is of aluminum oxide or the like and the photoemissive cathode layer 14d may be of conventional cesiated antimony composition. The structural details of the image converter tube as thus far described are entirely conventional and will be familiar to persons skilled in the art.

In operation, an X-ray image directed toward pick-up screen 14 passes through envelope section 12 and support member 14a and excites phosphor layer 14b, producing a visible image of the impinging X-radiation. This light image passes through transparent barrier layer 14c exciting photoemissive layer 14d which, in turn, emits an electron image having a charge distribution corresponding to the incident light and therefore to the original X-ray image. The focusing and accelerating electrode system, when energized with proper electrical potentials including conductive focus electrode 19 and anode 16, causes the image to be accelerated, reduced in size, and focused on fluorescent screen 15a.

The barrier layer 14c is formed in accordance with the process of the present invention. Specifically, aluminum is evaporated in vacuum onto the phosphor-resin substrate 14b to a thickness of approximately 30 angstroms. The thickness of the aluminum layer can be controlled within narrow limits by controlling the weight of aluminum available for evaporation.

The aluminum layer evaporated onto the substrate is inserted into an electric oven immediately after removal from the evaporator unit. The electric oven has been heated previously to a temperature below the depolymerization temperature of the silicon resin in the phosphor-resin substrate 14b. For resins applicable to pick-up screens of the type herein considered, the temperature of the electric oven should be approximately 350° centigrade.

It is important that the aluminum layer evaporated onto the substrate be inserted into the pre-heated oven without delay as the oxide layer being formed on the surface of the freshly evaporated aluminum layer at room temperature is generally of the mixed type (both tightly packed and porous aluminum oxide present). As pointed out above, porous aluminum oxide is unreliable as a barrier layer and its formation should be avoided.

The aluminum layer is baked in air in the electric oven for 10 to 15 minutes. A gas oven may be substituted for the electric oven provided the atmosphere in the gas oven is of an oxidizing and not of a reducing nature.

If the baking has been carried out as described above, the evaporated aluminum layer is completely converted into aluminum oxide of the tightly packed version and the formation of unreliable porous aluminum oxide is avoided. The transparency of the layer approaches 100 percent.

It has been found that the maximum thickness of the tightly packed aluminum oxide layer formed at a temperature of 350° centigrade in an atmosphere with a humidity of less than 50 percent is approximately 30 angstroms thickness. If the evaporated aluminum is applied to a thickness substantially in excess of 30 angstroms, a thin layer of pure aluminum may exist after oxidation which will decrease the transmission properties of the barrier layer, resulting in a loss of pick-up screen brightness. It has been further found that the required minimum thickness of the barrier layer; namely, 80 angstroms, can be readily obtained by repeating the described aluminum evaporation and oxidation process two additional times. After the aluminum oxide layer has been formed by the above process, care should be taken to minimize exposure of the layer to humid air even at room temperature because part of the tightly packed layer may, in the presence of a humid atmosphere, convert into loosely packed aluminum oxide and may even lead to the formation of aluminum hydroxide.

The formation of a tightly packed aluminum oxide layer of approximately 80 angstroms thickness as aforedescribed has been found to assure the elimination of the undesirable effects of cesium, otherwise experienced when cesium is able to penetrate to the resin strata.

While a particular embodiment of the present invention has been shown and described it is apparent that various changes and modifications may be made and it is therefore intended in the following claims to cover all such modifications and changes as may fall within the true spirit and scope of this invention.

I claim:

1. The method of forming on an X-radiation transparent substrate a multi-layer pick-up screen including a transparent barrier layer intermediate a fluorescent layer and a photoemissive layer which method comprises the steps of: evaporating aluminum onto said fluorescent layer; heating said aluminum layer in a dry atmosphere having a maximum humidity of approximately 50% to form a tightly packed aluminum oxide layer of substantially less than 80 angstroms thickness; repeating said evaporating and heating steps to form a barrier layer of tightly packed aluminum oxide to a minimum thickness of 80 angstroms; and forming a photoemissive layer over said barrier layer.

2. The method of forming on an X-radiation transparent substrate a multi-layer pick-up screen including a transparent barrier layer intermediate a fluorescent layer and a photoemissive layer which method comprises the steps of: evaporating a thin layer of aluminum onto said fluorescent layer; heating said aluminum layer in a dry atmosphere having a maximum humidity of approximately 50% to form a tightly packed aluminum oxide layer of approximately 30 angstroms thickness; repeating said evaporating and heating steps two times to form a barrier layer of tightly packed aluminum oxide to a minimum thickness of 80 angstroms; and forming a photoemissive layer over said barrier layer.

3. The method of forming on an X-radiation transparent substrate a multi-layer pick-up screen including a thin transparent barrier layer intermediate a fluorescent layer and a photoemissive layer which method comprises the steps of: evaporating a thin layer of aluminum onto said fluorescent layer; heating said aluminum layer in a dry atmosphere of less than 50 percent relative humidity to a temperature of less than 350° centigrade for a period of 10 to 15 minutes to form a tightly packed aluminum oxide layer of approximately 30 angstroms thickness; repeating said evaporating and heating steps two times to form a barrier layer of tightly packed aluminum oxide to a minimum thickness of 80 angstroms; and forming a photoemissive layer over said barrier layer.

References Cited in the file of this patent

UNITED STATES PATENTS

| | | |
|---|---|---|
| 2,199,438 | Lubszynski | May 7, 1940 |
| 2,676,117 | Colbert | Apr. 20, 1954 |
| 2,739,084 | Sommer | Mar. 20, 1956 |
| 2,804,561 | Sheldon | Aug. 27, 1957 |

UNITED STATES PATENT OFFICE

CERTIFICATE OF CORRECTION

Patent No. 3,011,919                                    December 5, 1961

Wilfrid F. Niklas

It is hereby certified that error appears in the above numbered patent requiring correction and that the said Letters Patent should read as corrected below.

Column 1, lines 26 and 33, column 2, line 70, and column 3, line 30, for "silicon", each occurrence, read -- silicone --

Signed and sealed this 29th day of May 1962.

(SEAL)
Attest:

ERNEST W. SWIDER                                    DAVID L. LADD
Attesting Officer                                        Commissioner of Patent